Figure 1:
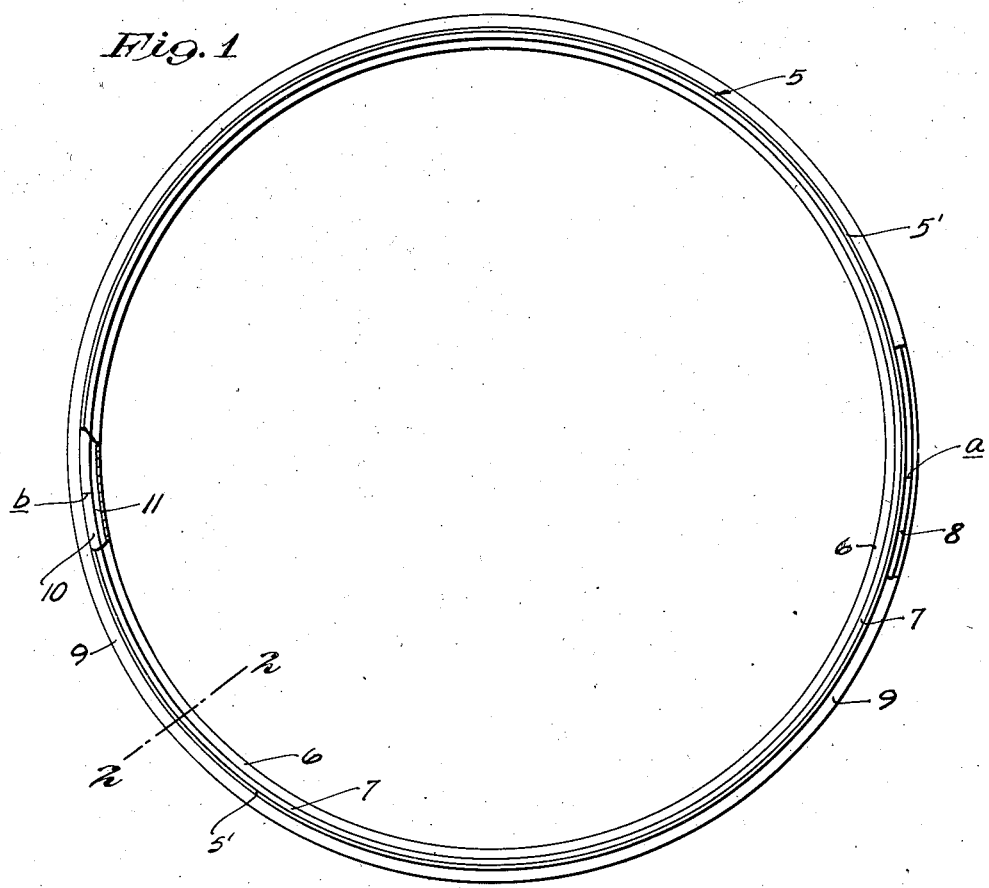

Oct. 12, 1943.  P. E. HAWKINSON  2,331,680
TIRE RETREADING MOLD
Filed Dec. 24, 1941

Inventor
Paul E. Hawkinson
By his Attorneys
Merchant & Merchant

Patented Oct. 12, 1943

2,331,680

UNITED STATES PATENT OFFICE 2,331,680

TIRE RETREADING MOLD

Paul E. Hawkinson, Minneapolis, Minn., assignor to Paul E. Hawkinson Company, Minneapolis, Minn., a corporation of Minnesota Application December 24, 1941, Serial No. 424,262

6 Claims. (Cl. 18—18)

My present invention relates to and provides an improved mold for use in applying retreads to tire casings and, generally stated, consists of the novel devices, combinations of devices, and arrangement of parts hereinafter described and defined in the claims.

The molds generally used in applying retreads to tires, in accordance with the Hawkinson system, are generally made from quite flexible steel bands bent approximately cylindrical and provided with sealing ribs at or near the edges of the mold. In the molding operation these cylindrical molds are subjected to quite high radially outward pressure which has a tendency to stretch and bulge the intermediate portion of the mold between sealing ribs or flanges, and, to prevent such bulging, circumferentially extended reinforcing hoops or bands have hitherto been applied circumferentially around the mold between sealing ribs.

In my prior Patent No. 2,065,697 of December 29, 1936, entitled "Tire tread," I have shown a tire especially designed as a snow tread or tread that will have exceptionally high traction in travelling over or through snow. The large and deep pockets produced in this tread are formed by lugs or blocks applied to the interior of the mold between the sealing ribs. These pocket-forming lugs, applied for the above purpose, are spaced and do not add tensile strength to the mold; and therefore, in the use of a mold designed for producing these so-called "snow treads," exterior reinforcements for the mold become additionally highly important.

The above and other features will be further discussed in the description of the mold illustrated in the accompanying drawing wherein like characters indicate like parts throughout the several views.

Figure 2:
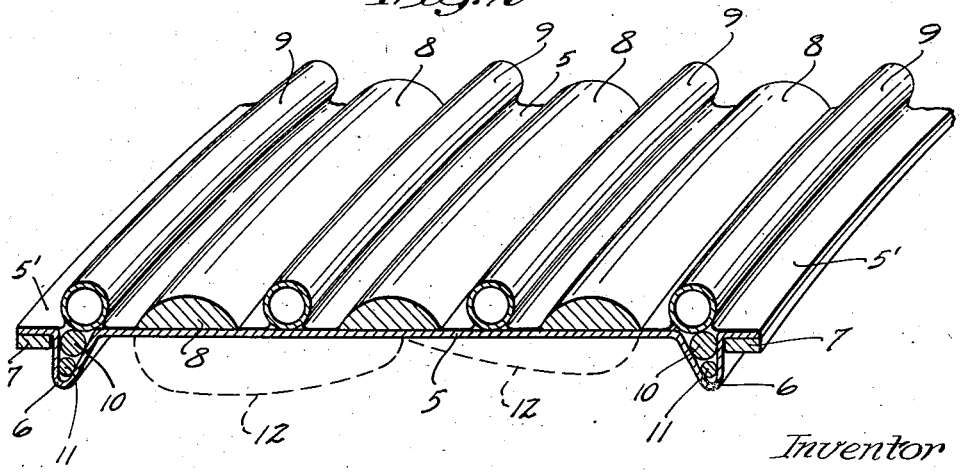

Referring to the drawing:

Fig. 1 is a side elevation showing the improved mold, some parts being broken away; and Fig. 2 is a fragmentary perspective taken through the mold on the line 2—2 of Fig. 1.

In the embodiment of the invention here illustrated, the numeral 5 indicates the sheet metal mold which is a transversely flat cylindrical structure formed slightly inward of its extreme edges with inwardly pressed sealing flanges or ribs 6 that are approximately V-shaped in cross-section. For an important purpose metallic stiffening rings 7 are applied and welded to the edge flanges 5' that project outward beyond the sealing flanges 6. These rings 7, as will hereinafter be noted, act chiefly in tension when the mold is subjected to outward pressure. Tension-acting reinforcing hoops 8 are applied around the exterior of the mold and welded together at their ends, and preferably also more or less at other points, to the exterior of the mold. The numeral 9 indicates a steam-conducting pipe that is wrapped around the exterior of the mold and also preferably welded or soldered thereto.

To reinforce the mold against circumferential stretching under high pressure, endless wire rings 10 and 11 are inserted in the cavities of the sealing ribs 6 in close contact therewith and in close contact, the one with the other. The wires 10 are of greater diameter than the wires 11 so as to correspond to the diverging cavities of the sealing flanges, and these reinforcing wires will be soldered together, not only at their ends, but to the sides of the sealing ribs and more or less to each other. This particular mold is assumed to be especially designed for applying retreads of the character shown in my said prior patent and for that purpose pocket-forming lugs or blocks 12 are secured to the interior of the mold between sealing ribs, either permanently or detachably.

These pocket-forming lugs, in themselves, do not reinforce the relatively thin sheet metal mold, and hence, the increased necessity for circumferential reinforcement of the mold.

The reinforcing wires or hoops 10 and 11, located within the channels of the sealing flanges 6 and soldered thereto, render the said flanges very strong and rigid both against tensile strain and lateral spreading. The steam tubes 9, which afford the preferred means of applying heat to the exterior of the mold, also, to some extent, reinforce the mold.

When the mold is applied around a tire casing and over the retreading rubber and the casing is then charged with air, the tread surface of the tire will be tightly forced against the sealing flanges and expanding pressure will be exerted against the interior of the mold between sealing flanges. This pressure will tend to bulge the intermediate portion of the mold radially outward and such bulging force will tend to rock the edge portions of the mold on the sealing flanges and will tend to contract the projecting edge portions 5'. The first noted force will, of course, be resisted by the mold itself and by the reinforcing hoops 8, and the latter noted or contracting action of the rims will be resisted by the rings 7. By the means described, the walls of the sealing ribs are solidly connected against lateral spreading and under the pressure on the mold have a fulcrum action in which radial outward pressure is resisted in tension by the so-called hoops 8 and is resisted in compression by the reinforcing rings 7.

The welded joint between the ends of the mold may be assumed to be at *a* on Fig. 1, and the welded ends of the reinforcing members 7, 8, 10 and 11, will be someplace circumferentially offset from the welded joint *a* as, for example, at *b* on said Fig. 1, but the said joint *b* also would preferably be circumferentially scattered.

This improved mold has been made and used and found highly efficient for the purposes had in view.

What I claim is:

1. A mold of the kind described made up of sheet metal and formed near its edges with inwardly projected integral sealing ribs and provided, outwardly of said ribs, with laterally outwardly projecting flanges, reinforcing endless metallic rings solidly connected to the inner surfaces of said outwardly projecting flanges, and tension-acting reinforcing hoops applied to the exterior of said mold at points between said sealing ribs, whereby under outward pressure on the mold the expansion will be resisted by said hoops, in tension, and will be resisted by said reinforcing rings, in compression.

2. A ring-shaped tire treading mold made of sheet metal and having inwardly projecting annular tire sealing flanges adjacent opposite side edges thereof, the mold having rigidly formed cylindrical extensions that project laterally outwardly beyond the sealing flanges, and an annular reinforcing ring embracing the inner face of each of the cylindrical extensions outwardly of said sealing rings and secured thereto, to resist inwardly bending of the cylindrical mold extensions in preventing outward bulging of the mold between the flanges under the expanding action of a tire confined therewithin, and hoops secured circumferentially to the outer face of the mold between the annular sealing flanges.

3. A ring-shaped tire treading mold made of sheet metal and having inwardly projecting annular tire sealing flanges adjacent opposite side edges thereof, the mold having rigidly formed cylindrical extensions that project laterally outwardly beyond the sealing flanges, and an annular reinforcing ring embracing the inner face of each of the cylindrical extensions outwardly of said sealing rings and secured thereto, to resist inwardly bending of the cylindrical mold extensions in preventing outward bulging of the mold between the flanges under the expanding action of a tire confined therewithin, and a hoop-like member secured circumferentially about the outer face of the mold in cooperative relation with the annular reinforcing ring member and cylindrical extensions to resist outward bulging of the mold between the flanges thereof.

4. A mold of the kind described made up of sheet metal and formed near its edges with inwardly projecting sealing ribs that are approximately V-shaped in cross section and provided, outwardly of said ribs, with laterally outwardly projecting flanges, reinforcing endless metallic rings solidly connected to said projecting flanges outwardly of said ribs, tension-acting hoop-like reinforcing means applied around said mold, laterally between said sealing ribs, and within said sealing ribs tension-acting reinforcing means rigidly secured to the walls of said ribs to hold the same against lateral spreading action.

5. A transversely flat cylindrical tire treading mold made of sheet metal and having inwardly projecting annular tire sealing flanges adjacent opposite side edges thereof, the mold having rigidly formed cylindrical extensions that project laterally outwardly beyond the sealing flanges, and an annular reinforcing ring embracing the inner face of each of the cylindrical extensions outwardly of said sealing rings and secured thereto, to resist inwardly bending of the cylindrical mold extensions in preventing outward bulging of the mold between the flanges under the expanding action of a tire confined therewithin, and a hoop-like member secured circumferentially about the outer face of the mold in cooperative relation with the annular reinforcing ring member and cylindrical extensions to resist outward bulging of the mold between the flanges thereof.

6. A transversely flat cylindrical tire treading mold made up of sheet metal and formed near its edges with inwardly projecting sealing ribs that are approximately V-shaped in cross section and provided, outwardly of said ribs, with laterally outwardly projecting flanges, reinforcing endless metallic rings solidly connected to said projecting flanges outwardly of said ribs, tension-acting hoop-like reinforcing means applied around said mold, laterally between said sealing ribs, and within said sealing ribs tension-acting reinforcing means rigidly secured to the walls of said ribs to hold the same against lateral spreading action.

PAUL E. HAWKINSON.